United States Patent
Greune

[15] 3,653,206
[45] Apr. 4, 1972

[54] CONTROL SYSTEM FOR GAS TURBINE ENGINES

[72] Inventor: Christian Greune, Schongeising, Germany

[73] Assignee: Motoren-und Turbinen-Union Munich GmbH, Munich, Germany

[22] Filed: Mar. 31, 1970

[21] Appl. No.: 24,278

[30] Foreign Application Priority Data

Apr. 5, 1969 Germany ............... P 19 17 625.1

[52] U.S. Cl. .................................. 60/39.28, 60/243
[51] Int. Cl. ........................................ F02c 9/06
[58] Field of Search ........................... 60/39.28

[56] References Cited

UNITED STATES PATENTS

| 3,133,416 | 5/1964 | Mock | 60/39.28 |
| 3,230,709 | 1/1966 | Turner | 60/39.28 |
| 3,531,936 | 10/1970 | Widell | 60/39.28 |
| 3,360,050 | 12/1967 | Sibley | 60/39.28 X |
| 3,240,013 | 3/1966 | Spath | 60/39.28 |

Primary Examiner—Clarence R. Gordon
Attorney—Craig, Antonelli & Hill

[57] ABSTRACT

A control installation for a gas turbine engine which limits the maximum temperature of the propellant gases by an adjusting device controlled by an exhaust gas temperature regulator, which influences the fuel speed regulating device.

10 Claims, 1 Drawing Figure

PATENTED APR 4 1972
3,653,206
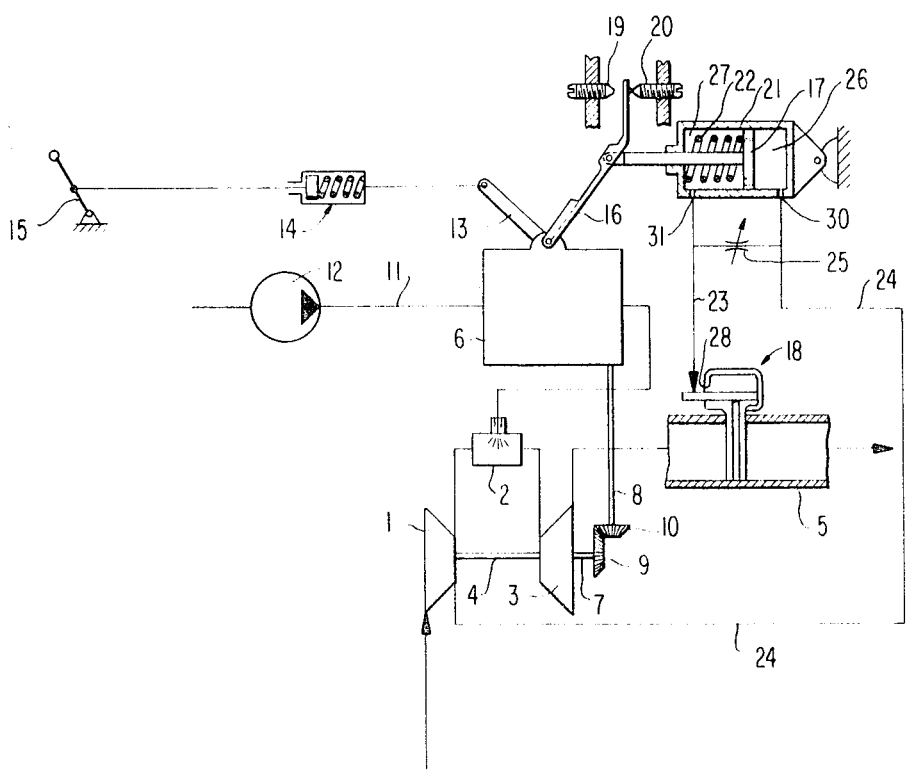
INVENTOR
CHRISTIAN GREUNE
BY Craig, Antonelli,
Stewart & Hill
ATTORNEYS

CONTROL SYSTEM FOR GAS TURBINE ENGINES

The present invention relates to a control system of gas turbine engines for limiting the maximum temperature of the propellant.

The gaseous energy supplied by a gas turbine engine in the form of the pressurized hot exhaust gases can be further utilized in the units arranged downstream of the engine proper, e.g., in a thrust nozzle or in a separate turbine (free-power turbine).

As a rule, gas turbine engines comprise a compressor, a combustion chamber and a turbine driving the compressor, and may further be equipped with a fuel control unit controlling or metering the necessary fuel quantity by means of a governor and using other signals, such as the compressor delivery pressure, for limiting the maximum fuel quantity.

Under certain operating and ambient conditions, the temperature of the gases upstream and downstream of the compressor turbine may become excessively high, thereby endangering the gas turbine engine. For the protection of the gas turbine engine a temperature sensor has already been proposed which limits the fuel quantity to be metered. In the systems already proposed in the prior art, this is effected by reducing the compressor delivery or end pressure used for limiting the fuel quantity. However, these prior art systems entail certain inherent disadvantages. For instance, due to necessary control accuracy, a small P-range and therewith a high amplification of the temperature control circuit or loop is required. Due to the mass of the temperature sensor, however, a reduction in the time constant of the sensor is limited, so that a considerable drop of the compressor delivery or end pressure might result when the temperature limit is reached. This causes the rotary speed of the gas turbine engine to drop, and as a result of this speed drop, the compressor delivery or end pressure will be decreased further.

It is the aim of this invention to eliminate these drawbacks.

As solution to the underlying problems, the present invention mainly proposes for a control installation of the type described above that the control or adjusting element of the temperature regulator influences the set point of the fuel governor control or speed regulating unit. In this manner, a fixed relationship between the regulating distance and the exhaust gas temperature is obtained, which will no longer be affected by other parameters during the control cycle.

According to a further feature of the present invention, the control element is to consist of an actuating piston, spring-loaded on one side, which is short-circuited by an adjustable throttle or restrictor and which is connected on the side of the spring with the outlet orifice or control aperture of the temperature regulator and on the side opposite the spring, is in communication with the supply of the auxiliary or servo energy.

Furthermore, a spring-loaded telescope is to be positioned according to the present invention, between the speed selector lever and the operating lever in order to permit the temperature regulator to override the movement of the operating lever.

Accordingly, it is an object of the present invention to provide a control system for gas turbine engines which avoids by simple means the aforementioned drawbacks and shortcomings.

Another object of the present invention resides in a gas turbine power plant which limits the temperature of the gases of the drive turbine to a predetermined maximum value.

A further object of the present invention resides in a temperature control installation for gas turbine power plants which is simple in construction, reliable in operation and without influence on parameters that should not be affected by the control operation.

Still a further object of the present invention resides in a control installation for limiting the temperature of the gases of the turbine in a gas turbine power plant which is fully and automatically effective regardless of the position of the operating lever for the speed selection.

These and further objects, features and advantages of the present invention will become more obvious from the following description when taken in connection with the accompanying drawing which shows, for purposes of illustration only, one embodiment in accordance with the present invention, and wherein:

The single FIGURE is a schematic view of a control installation for a turbine engine in accordance with the present invention.

Referring now to the single FIGURE of the drawing, the gas turbine engine illustrated therein essentially consists of a compressor 1, of a combustion chamber 2 and of a turbine 3 driving the compressor 1 by way of shaft 4. The propelling gases discharged from turbine 3 enter the installations arranged downstream, for example, a free-power turbine (not shown in the drawing) or a jet pipe fitted with a thrust nozzle by way of a pipe line 5. A fuel governor control unit 6 of conventional construction is driven by the gas turbine engine by way of shafts 7, 8 and gears 9, 10 and receives its fuel from pump 12 by way of a line 11. The speed selector lever 13 is actuated by the operating lever 15 by way of a spring-loaded telescope generally designated by reference numeral 14. The stop lever 16, which is actuated by an actuation piston 17 controlled by the temperature regulator 18 of conventional construction, acts as a variable stop for the speed selector lever 13, between the adjustable stops 19 and 20.

The actuating piston 17, which is axially displaceably guided in an actuating cylinder 21 and is under prestress of a spring 22, is short-circuited by a restrictor or throttling device 25 with adjustable cross-section, which is connected between lines 23 and 24. In this manner, air tapped from the compressor reaches by way of line 24 and orifice 30, the cylinder chamber 26 of the actuating cylinder 21 and thus acts on that end of actuating piston 17 which is located opposite the spring. Additionally, the air from compressor 1 in line 24 reaches the cylinder chamber 27 on the side of spring 22 of the actuating cylinder 21 by way of variable restrictor or throttling device 25 and an orifice or bore 31 as well as the outlet orifice 28 of the temperature regulator 18 by way of the line 23. When the set or desired value of the exhaust gas temperature is exceeded, to which the temperature regulator 18 is adjusted, the pressure regulating valve or throttle 28 is opened, and the actuating piston 17 displaces the stop lever 16, whose position can be adjusted in the direction towards a lower speed, thus reducing the maximum speed which can be selected by means of speed selector lever 13. Since a predetermined relationship exists between the speed and the exhaust gas temperature, the exhaust gas temperature is prevented from exceeding the set point or intended value by a reduction in rotary speed.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A control system for gas turbine engines for limiting the maximum temperature of the propellant, which includes fuel speed regulating means, characterized by exhaust gas temperature regulator means having adjusting means operatively connected with and influencing the set value of the fuel speed regulating means.

2. A control system as set forth in claim 1, in which said adjusting means includes an actuating piston spring-loaded on one side, which is short-circuited by a throttle means, said actuating piston being operatively connected on the spring side thereof with a control aperture of the temperature regulator means and being subjected to a servo energy supplied to the side thereof opposite the spring.

3. A control system according to claim 2, wherein said throttle means is adjustable.

4. A control system as set forth in claim 3, in which a spring-loaded telescope means is arranged between a speed selector lever and an operating lever which enables the temperature regulator means to override the movement of the operating lever operatively connected with said fuel speed regulating means.

5. A control system according to claim 1, in which the fuel speed regulating means includes means for adjusting the fuel supply between two limits, and in which said adjusting means reduces the limit of maximum fuel supply in the direction of reducing the rotational speed of the engine in case of exceeding the predetermined temperature.

6. A control system according to claim 5, in which said adjusting means includes an adjustable stop for an operating member, which is adjusted in dependence on the propellant temperature of the turbine.

7. A control system according to claim 6, with a speed selector means, and means for overriding the speed selector means by said adjusting means.

8. A control system according to claim 5, with a speed selector means, and means for overriding the speed selector means by said adjusting means.

9. A control system as set forth in claim 1, in which a spring-loaded telescope means is arranged between a speed selector lever and an operating lever which enables the temperature regulator means to override the movement of the operating lever operatively connected with said fuel speed regulating means.

10. A control system as set forth in claim 2, wherein said servo energy is supplied by a compressor means of the engine.

* * * * *